March 19, 1935. H. HAUSEN ET AL 1,994,515

AIR CONDITIONING SYSTEM

Filed Oct. 12, 1933

INVENTORS
HELMUTH HAUSEN
AND LOTHAR MEYER
BY
ATTORNEY

UNITED STATES PATENT OFFICE 1,994,515

AIR CONDITIONING SYSTEM

Helmuth Hausen, Solln by Munich, and Lothar Meyer, Pullach by Munich, Germany, assignors to The Linde Air Products Company, a corporation of Ohio Application October 12, 1933, Serial No. 693,254
In Germany October 28, 1932

9 Claims. (Cl. 257—8)

The present invention relates to an improved process and system for maintaining desirable air conditions within enclosures.

Objects of the present invention are to provide an improved air conditioning process and system adapted to renew the air in enclosures frequently and economically, whereby a maximum of the cold or heat content of the escaping air may be extracted and utilized in cooling or heating incoming fresh air; whereby fresh air may be supplied to a room in a substantially dry state or with a substantially constant water vapor content; whereby a relatively large volume of air may be renewed by relatively small sized and inexpensive equipment; and which is adapted to operate continuously with a minimum of attention.

According to the present invention, as stale air is discharged from the enclosure which is to be air-conditioned, cold or heat content of such air is extracted and stored; and subsequently, heat or cold so stored is given up to fresh air supplied to said space. At the same time, moisture is separated from the air flowing from the atmosphere into the enclosure, and moisture so separated is subsequently evaporated and additional moisture injected into the current of air flowing in the reverse direction. In accordance with an alternative method, moisture may be more completely separated from the atmospheric air by passing said air first through a cold chamber or regenerator and then through a dehydrating chamber, or through another cooling device such as a refrigerator.

The invention is partly based upon the observation that the air discharged from enclosures is usually not saturated with humidity and, therefore, if brought into contact with water, causes water to evaporate. Whenever air absorbs water, heat is also absorbed. This cooling effect due to the evaporation of water is utilized for cooling the air of the enclosure.

The enclosure to be ventilated may communicate with the outside atmosphere through ducts or conduits containing suitable means for extracting and storing heat or cold content of air passed therethrough in one direction and for subsequently giving up heat or cold so stored to air passed through such conduit means in the reverse direction. The conduits may preferably consist of one or more pairs of ducts of the same capacity, whereby substantially equal volumes of stale air and fresh air may be discharged and supplied, simultaneously. Each conduit preferably includes a chamber or regenerator containing a series of metal gratings presenting a relatively large surface contact area, through which air may flow in either direction, and to which or from which the air may give up or take up heat or cold. Preferably also, means are provided for introducing moisture into the regenerator through which air is being discharged. The air flow through a pair of conduits and regenerators is periodically reversed at suitable intervals, so that fresh air enters first through one conduit and then through the other, while stale air is simultaneously discharged alternately through these conduits in reverse order.

The above and other objects and the novel features of this invention will be apparent from the following description taken in connection with the accompanying drawing, in which Fig. 1 represents a diagrammatic view of a ventilating system embodying this invention;

Figure 1:
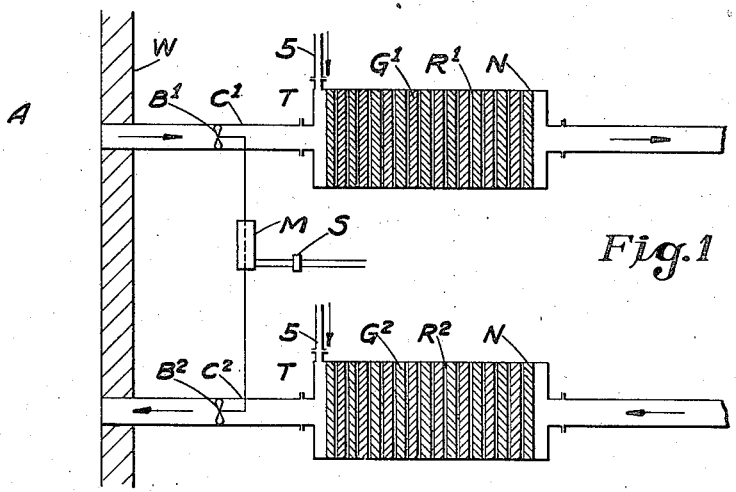

Referring to Fig. 1 of the drawing which diagrammatically illustrates a system embodying the principles of this invention, W designates one wall of an enclosure E which is to be air-conditioned, and A designates the outside atmosphere or source of fresh air. The temperature of the air in the enclosure E may be either higher or lower than, or the same as, the temperature of the fresh air of the atmosphere A.

Figure 3:
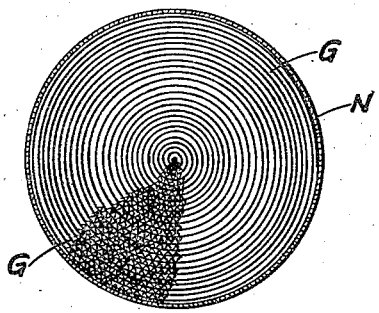
Fig. 3 is a cross-sectional view of one of the regenerators on an enlarged scale.

Spent air may be discharged from the enclosure E, and substantially the same volume of fresh air may be simultaneously supplied thereto, through suitable passages, such as the conduits $C^1$, $C^2$ which extend through the wall W. In the paths of the air flowing through these conduits, suitable means are provided to extract heat or cold from the discharging air, to store such heat or cold, and to yield heat or cold so stored to the fresh air supplied to the enclosed space. As shown, regenerators $R^1$, $R^2$ are provided for this purpose, the same communicating with the enclosure E and with the atmosphere, through the conduits $C^1$, $C^2$, respectively. In accordance with a feature of this invention water may be introduced into the regenerator through which the air is being momentarily discharged into the atmosphere. The water may be introduced either at the right or at the left (top or discharge end) of the regenerator; the latter alternative is shown at 5 in Fig. 1 of the drawing in which the regenerators may be assumed to stand upright so that the end T forms the top part in order to effect a simultaneous washing with counter-currently flowing water. Each generator comprises a shell or casing N containing a series of spaced gratings through which air may flow in either direction. These gratings $G^1$, $G^2$ are preferably made of metal having a high thermal capacity, and have a relatively large surface contact area. As shown in more detail in Fig. 3, each grating may comprise a grooved or corrugated metal strip rolled up spirally to form a reticular plate-like member corresponding in size to the inside cross-section of the regenerator shell.

Suitable means may be provided to insure the circulation of air through the conduits $C^1$, $C^2$ and to periodically reverse the air flow, in order to extract and store heat or cold in one regenerator while previously extracted heat or cold is given up to fresh air flowing into the enclosure E through the other regenerator. As shown, blowers or fans $B^1$, $B^2$ in conduits $C^1$, $C^2$ respectively, may be driven in opposite directions by an electric motor M which is automatically reversed at predetermined intervals by means of a suitable periodically-operating reversing electric switch S connected in the electrical circuit of the motor. Air from the space or enclosure E will thus be discharged alternately through the regenerators $R^1$, $R^2$, while fresh air will be alternately supplied to said space through the regenerators $R^2$, $R^1$.

In describing the operation of the system, it may be assumed that the temperature of the air in the enclosure E is to be maintained at 25° C. (77° F.) and a relative humidity content of 60%, whereas the atmospheric air has a temperature of 35° C. (86° F.) and a relative humidity content of 35%. The used air is to be discharged from the enclosure E in the direction shown by the arrows. The outgoing air which has a temperature of 25° C. and a relative humidity content of 60% becomes saturated with water from the regenerator and, if the saturation proceeds mainly adiabatically, the air is cooled according to the well-known Mollier or ix diagram to about 19° C. (66.2° F.). The cooling effect which is thus produced is imparted to the metallic gratings $G^2$ of the regenerator which consequently, in its normal state of operation, assumes a temperature of about 19° C. Upon the subsequent reversal of the air current in the regenerator, the incoming atmospheric air absorbs the cold abstracted from the outgoing air, whereby it is correspondingly cooled and dried. Taking into account the usual losses due to imperfect cold exchange, the incoming air will be cooled to a temperature of approximately 20° C. (68° F.). Without the cooling effect due to evaporation of the water, the fresh air, with equal exchange losses, would enter the enclosure at a temperature of about 26° C. (78.8° F.). The specific heat of substantially dry air at a constant pressure being 0.24, we obtain a net gain due to the cooling effect of the evaporated water of (26—20) . 0.24 or 1.44 kilogram-calories of cold per kilogram of atmospheric air introduced into the system. The water consumption amounts to about 3 grams per 1000 grams of the incoming air.

Inasmuch as the discharged air is saturated with water at the lowest temperature occurring in the regenerator, and that, upon heating, this air absorbs more water in the form of vapor, additional cold is liberated, although at progressively increasing temperatures along the regenerator toward its end connected with the outside atmosphere. Thus there occur great temperature differences between the metal of the regenerator and the gas discharged at the warm end of the regenerator, so that smaller regenerators are required for any given loss in refrigeration.

Figure 2:
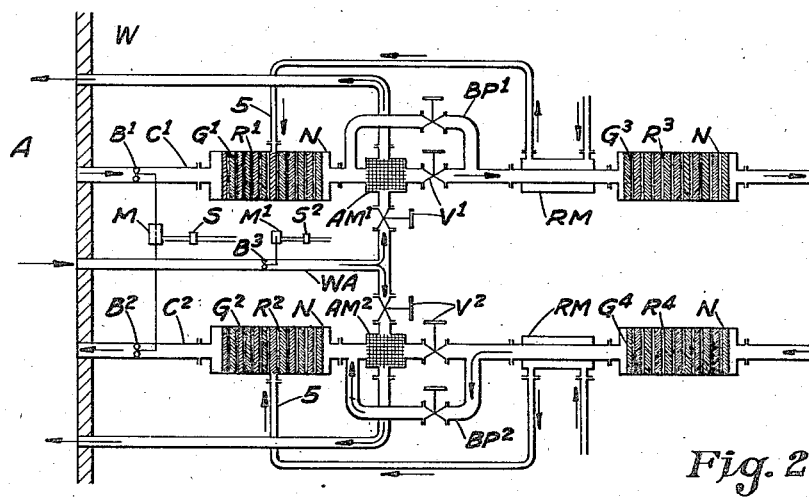
Fig. 2 shows diagrammatically a modification of the system of Fig. 1.

The embodiment of the invention described is particularly well adapted for ventilating cooled rooms when the absolute humidity content of the atmospheric or fresh air is no higher than that of the air in the enclosure i. e., if no drying of the fresh air is necessary. If such a drying becomes necessary, the operation of the invention may be modified as follows:

If only small quantities of moisture are to be precipitated out of the fresh air, drying or dehydrating by means of an adsorption medium such as, for example, silica gel, is usually sufficient. The fresh air is first cooled in the regenerator to the dew point as described above, and is then conducted over the adsorption medium which is shown schematically at $AM^1$ in Fig. 2. The adsorption medium may be regenerated periodically, if necessary, by passing warm fresh air over the same. A continuous operation may be attained through the utilization of the regenerative principle, in that there are alternately passed over the adsorbent, first the cooled fresh air which is to be dried, and next warm fresh air which is not utilized for room ventilation and which absorbs the separated moisture. This may be accomplished by the provision of by-passes $BP^1$ and $BP^2$ and of the valves $V^1$ and $V^2$, whereby the atmospheric air may be alternately conducted over the adsorbing media $AM^1$ and $AM^2$, and whereby the return air flow may be by-passed from the adsorbent $AM^2$ as shown by the arrows. Electric motor $M^1$, switch $S^2$ and blower $B^3$ are provided for this purpose.

If however, a larger quantity of moisture must be removed from the air, drying by means of an adsorption medium or chemical media is less economical than drying through additional cooling by means of a refrigeration machine. In this event the operation proceeds according to the method also shown schematically in Fig. 2. $R^1$ and $R^2$ represent a pair of regenerators in which discharged air and fresh air exchange their heat content and in which cold is produced by the saturation of the discharged air with water vapor. The introduction of the water is effected in such a manner that the incoming atmospheric air leaves the regenerator at the lowest temperature attainable by means of the saturation of the discharged air with water vapor. In this modification of the invention, the atmospheric air, which has thus been intensely precooled, is further cooled, for example, by means of a refrigeration machine such as shown at RM, to a temperature at which the absolute humidity content of the saturated air has attained the degree desired for the conditioned air of the enclosure. The cold condensate resulting from this cooling and drying may be utilized, as shown, for moistening the regenerators $R^1$ or $R^2$. The cold and dried fresh air may either be directly introduced in a finely distributed state into the enclosure E to be cooled, or it may be warmed in a second pair of regenerators shown at $R^3$ and $R^4$, or in a counter-current cooler, whereby it transfers its cold content either partially or entirely to the discharged air.

When the cooled dried air becomes saturated with water vapor in the exhaust regenerator after leaving the enclosure, the cold absorbed during the drying is liberated and stored in the gratings, and after the reversal of the air current in the regenerators is again available for removing or reducing the humidity of the atmospheric air. In normal operation, therefore, the refrigeration machine RM needs to produce only the amount of refrigeration which is needed for covering the losses due to imperfect heat exchange and for condensing the additional moisture in the air-cooled enclosures. Thus, by combining the drying of the air through cooling by means of a refrigeration machine with the cold exchange of the discharged air with fresh air in moistened regenerators, the energy consumption required for cooling and drying the air is reduced to a fraction of the amount otherwise required.

An important advantage of the system described, especially in its application to the air-conditioning of cooled enclosures, consists in the fact that the incoming fresh air is cooled and simultaneously dried during the heat exchange in the regenerator or regenerators. The cooling of the fresh air greatly reduces its water vapor content by condensing the moisture to a liquid or solid state. The water or ice thus precipitated in the regenerator is again evaporated by the reverse flow of air from the cooled enclosure since this air contains, at most, only so much water vapor as the saturation in the cooled enclosure permits and, as its temperature rises, absorbs increasing amounts of water vapor. Hence, refrigeration derived from the vaporization of the water or ice will again be substantially recovered, and consequently a very considerable saving of refrigeration, i. e., energy, is attained.

Other important advantages of this process are: (1) the regenerators may be of relatively small external dimensions and yet capable of enclosing very large grating surfaces and masses; (2) a very complete heat exchange is thereby attained, so that the cold or heat losses which are usually involved in the expense of ventilation are reduced to a minimum; (3) since the separated moisture is periodically revaporized, there will be no clogging of the gratings by ice formation and the use of the regenerators and the operation of the process may therefore be practically continuous.

It will be understood that the method and apparatus described herein may be modified in numerous particulars without departing from the spirit and scope of this invention as defined in the following claims.

We claim:

1. The method of ventilating and conditioning an enclosure, which comprises discharging air from and supplying fresh air to said enclosure, extracting heat or cold from air being discharged, temporarily storing said extracted heat or cold, transferring heat or cold from such stored heat or cold to fresh air that is being supplied to said enclosure, separating moisture from the air entering said enclosure, and compensating for the losses occurring during the heat exchange by evaporating moisture into the discharged air.

2. The process of air-conditioning an enclosed space, which comprises discharging stale air from said space along one path while supplying fresh air to said space along another path periodically reversing the air flow along said paths so that air is alternately discharged from and supplied to said space along each of said paths; extracting heat or cold from the air being discharged and storing such extracted heat or cold along the path of the outflowing air, transferring stored heat or cold to the inflowing air, separating moisture from the inflowing air, evaporating moisture into the outflowing air whereby the amount of cold extracted from said outflowing air is increased, reducing the relative humidity content of the incoming atmospheric air by passing said air over a moisture adsorbing medium, and alternately passing cooled fresh air and atmospheric air over said medium for restoring its drying capacity.

3. The method of air-conditioning an enclosure connected by two separate passages to the outside atmosphere, which comprises withdrawing stale air from said enclosure through one of said passages while supplying fresh air to said enclosure through the other passage, periodically reversing the direction of air flow through said passages so that air is alternately withdrawn and supplied through each passage, extracting heat or cold from the air being withdrawn and storing such extracted heat or cold in the passage through which the air is withdrawn, transferring stored heat or cold to the fresh air being supplied to said enclosure, separating moisture from the air entering said enclosure and evaporating moisture into the air discharged from said enclosure, and reducing the relative humidity content of the cooled incoming atmospheric air by subjecting said air to a second cooling operation.

4. Method as defined in claim 3 in which the relative humidity content of the cooled atmospheric air entering said enclosure is reduced by subjecting said air to the effects of a dehydrating agent.

5. Method as defined in claim 3 in which the relative humidity content of the incoming atmospheric air is reduced by subjecting said air to a further cooling operation, whereupon the cooled air is brought to the desired temperature condition by bringing it into heat-exchange relation with additional storage means having substantially the same temperature as the air discharged from said enclosure.

6. In a ventilating system, the combination with an enclosure to be ventilated, of a pair of chambers, means whereby air is alternately discharged from said enclosure through said chambers and whereby fresh air is supplied through said chambers alternately to said enclosure, means in said chambers whereby heat or cold is extracted from the discharging air and stored, and heat or cold so stored is given up to the fresh air supplied to said space, means for separating moisture from the air entering said enclosure and for evaporating said moisture into the air flowing through said chambers in the reverse direction, adsorbing means for dehydrating the atmospheric air supplied to said space, air inlets, air outlets and a conduit by-passing said dehydrating means, said air ducts and said by-pass being conductively inter-connected in such a manner that the dehydrating means is alternately subjected to the cooled incoming air to be dried, and to warm incoming air which absorbs the moisture derived from said cooled air.

7. In a system as defined in claim 6, the combination with an enclosure to be air-conditioned, of passages communicating with said enclosure and with the atmosphere, a series of metal gratings in each of said passages, said gratings consisting of a metal having a high thermal capacity, said metal being arranged to expose a relatively large surface area to contact with said air and being adapted to extract heat or cold from air discharged from said enclosure through said passages and to store such heat or cold, and further adapted to yield heat or cold so stored to fresh air supplied through said passages to said enclosure.

8. In a ventilating system, the combination with an enclosed space to be ventilated, of conduits communicating with said space and with the atmosphere outside said space, means for simultaneously discharging air from said space through one of said conduits and supplying fresh air through the other conduit to said space, means for periodically reversing the air flow through said conduits whereby air is discharged and fresh air is supplied alternately through each conduit, a series of metal gratings in each of said conduits whereby heat or cold is extracted from the discharging air and stored, and heat or cold so stored is given up to the supplied fresh air, means for separating moisture from the air entering said space and for evaporating additional moisture into the current of air exhausted from air flowing through said conduits in the said space, and additional means for drying said incoming current of air.

9. System as defined in claim 8 further characterized by the provision of means for periodically regenerating the moisture-adsorbing capacity of the air-drying means.

HELMUTH HAUSEN.
LOTHAR MEYER.